United States Patent
Banta

(10) Patent No.: US 7,398,621 B2
(45) Date of Patent: Jul. 15, 2008

(54) CONNECTOR ASSEMBLY

(76) Inventor: Bradford C. Banta, 655 S. Raymond Ave., Pasadena, CA (US) 91105

(*) Notice: Subject to any disclaimer, the term of this patent is extended or adjusted under 35 U.S.C. 154(b) by 574 days.

(21) Appl. No.: 10/762,776

(22) Filed: Jan. 21, 2004

(65) Prior Publication Data
US 2005/0155314 A1 Jul. 21, 2005

(51) Int. Cl.
E04B 7/04 (2006.01)
E04B 1/38 (2006.01)
B25G 3/00 (2006.01)

(52) U.S. Cl. ............................ 52/93.1; 52/92.2; 52/713; 403/235; 403/236

(58) Field of Classification Search ................... 52/93.1, 52/93.2, 713, 712, 92.1, 92.2; 403/DIG. 15, 403/231, 233–236
See application file for complete search history.

(56) References Cited

U.S. PATENT DOCUMENTS

| | | | | |
|---|---|---|---|---|
| 2,365,501 A | * | 12/1944 | Walstrom | ............... 403/174 |
| 4,007,993 A | * | 2/1977 | Schwartz | ............... 403/3 |
| 4,189,247 A | * | 2/1980 | Burwall | ............... 403/4 |
| 4,209,265 A | * | 6/1980 | Moehlenpah | ............... 403/230 |
| 4,589,795 A | * | 5/1986 | MacLeod | ............... 403/233 |
| 5,403,110 A | | 4/1995 | Sammann | |
| 5,961,242 A | * | 10/1999 | Leone | ............... 403/234 |
| 2004/0079034 A1 | * | 4/2004 | Leek | ............... 52/92.2 |

* cited by examiner

Primary Examiner—Brian Glessner
Assistant Examiner—Adriana Figueroa

(57) ABSTRACT

A connector assembly for use in securely joining together elongated structural members, which extend angularly with respect to one another. The connector assembly is ideally suited for use in interconnecting wooden structural members that make up playground equipment for use by young children and includes specially designed connector plates that are uniquely designed to provide both longitudinal and transverse stability to the structure formed by the interconnected structural members. Each of the gripping plates is lanced out to form a plurality of penetrating tabs that are adapted to penetrate the structural members as the gripping plates are cinched down by through bolts so as to provide still further rigidity to the assembled structure.

18 Claims, 9 Drawing Sheets

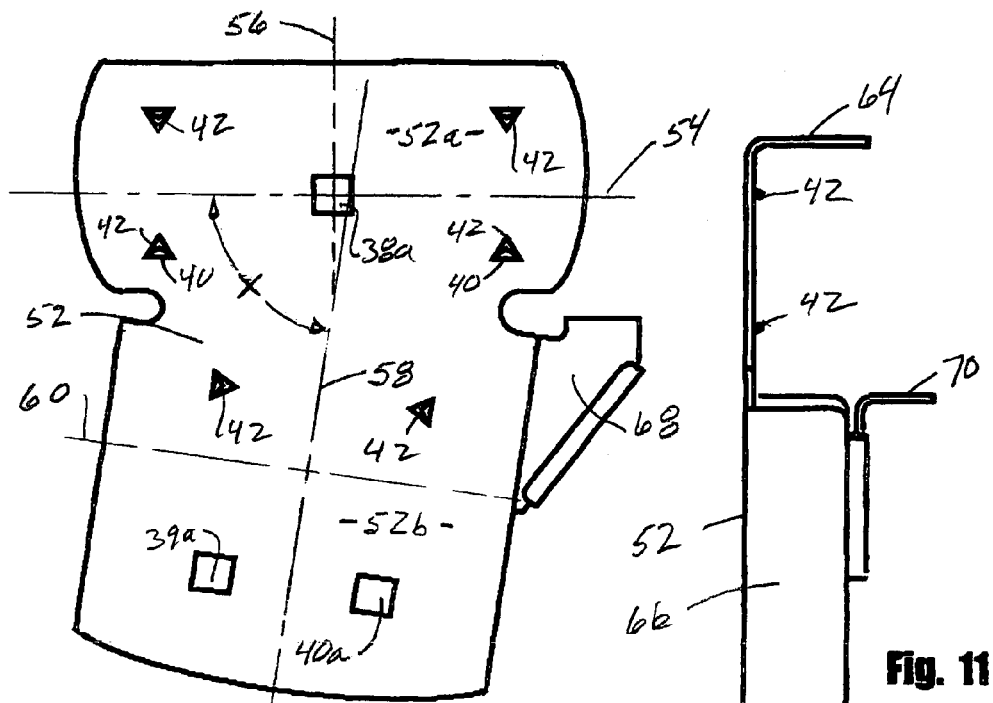
Fig. 10
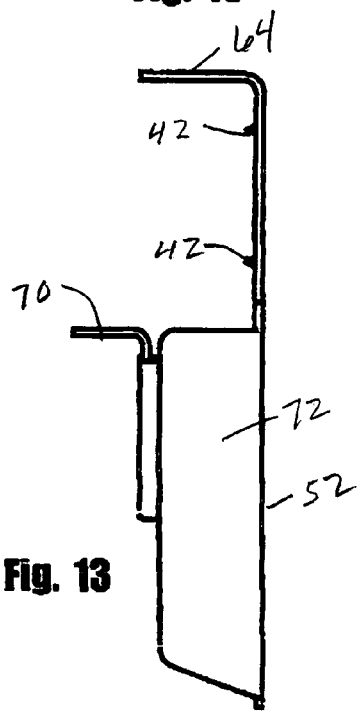
Fig. 11
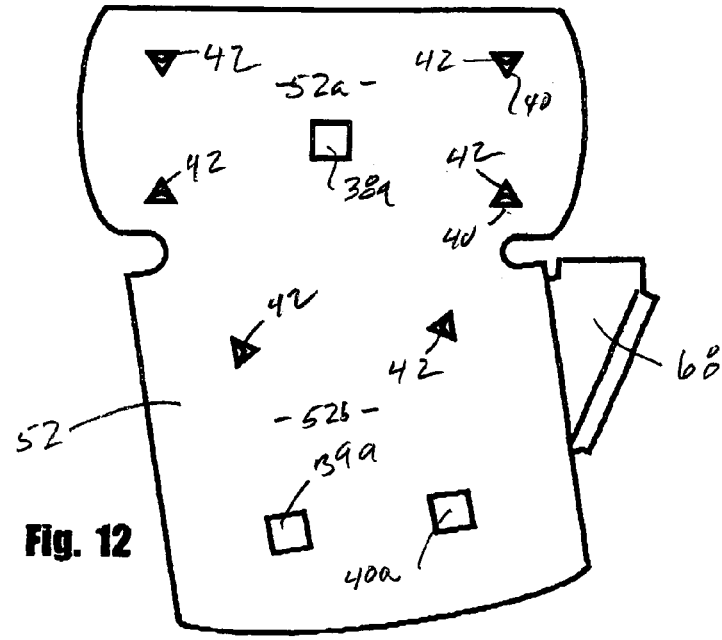
Fig. 13
Fig. 12

CONNECTOR ASSEMBLY

BACKGROUND OF THE INVENTION

1. Field of the Invention

The present invention relates generally to structural connectors. More particularly, the invention concerns a flanged connector assembly for use in connecting together elongated structural members that extend at an angle with respect to one another.

2. Discussion of Prior Art

Various types of connectors have been suggested in the past for joining together structural members, such as lengths of dimension lumber, structural wood beams, and the like. Often the prior art connectors take the form of clamp assemblies that are used to join together perpendicularly arranged structural member to form permanent and temporary structures such as scaffolds and playground structures.

As a general rule the prior art clamp assemblies comprise shaped gripping members that are formed of sheet metal by a combination of cutting, punching, stamping and bending operations. The formed gripping members are typically apertured to receive one or more bolts that are used to interconnect the gripping members with the structural members that are to be joined together.

Exemplary of a connector assembly used to construct playground structures is the connector assembly disclosed in U.S. Pat. No. 5,403,110 to Sammann. The Sammann device comprises a clamp assembly for joining perpendicularly arranged, square, elongate, structural remembers to form a framework. The clamp assembly comprises a pair of shaped gripping members aligned in a confronting relationship respective to one another. The gripping members have parts that form opposed sockets, which are arranged perpendicular to one another. One of the sockets receives an end of one structural member therewithin, and the other of the sockets receives a medial length of the other structural member to secure the perpendicularly arranged structural members together. Two bolts, which extend perpendicular through a part of the gripping members and in between the elongate structural members, is tensioned to force the pair of gripping members to bear against the structural members.

A drawback of certain of the prior art connector assemblies resides in the fact that the connector assemblies, while providing generally lateral stability to the structure that embodies the connector assembly often fails to provide adequate longitudinal stability to the structure. It is this deficiency that the connector assembly of the present invention seeks to overcome by providing a novel flanged connector assembly which includes strategically located side support brackets which effectively resists off center, longitudinal loading that may be exerted in the structure.

SUMMARY OF THE INVENTION

It is an object of the present invention to provide a connector assembly for use in securely joining together elongated structural members, which extend angularly with respect to one another.

More particularly, it is the object of the invention to provide a connector assembly of the aforementioned character, which is uniquely designed to provide both longitudinal and transverse stability to the structure formed by the interconnected structural members.

Another object of the invention is provide a connector assembly for securely joining together structural members that extend perpendicularly to one another or alternatively to structural members that extend angularly with respect to one another at angles other than ninety degrees.

Another object of the invention is to provide a connector assembly of the character described in the preceding paragraphs which includes strategically located, are spaced apart through bolts that extend through the opposing brackets and through each structural member to further improve rigidity.

More particularly it is an object of the invention to provide a connector assembly which is made up of a pair of strategically confronting gripping plates that are aligned in a confronting relationship and are securely bolted together by strategically located through bolts.

Another object of the invention is to provide a connector assembly of the type described in the previous paragraphs in which each of the gripping plates is lanced out to form a plurality of penetrating tabs that are adapted to penetrate the structural members as the gripping plates are cinched down by the through bolts so as to provide still further rigidity to the assembled structure.

Another object of the invention is provide a connector assembly of the class described which is ideally suited for use in interconnecting wooden structural members that make up playground equipment for use by young children. In this regard, the confronting gripping plates are specially designed and fabricated so as to be free of any sharp corners or edges that could injure children using the assembled playground equipment.

BRIEF DESCRIPTION OF THE DRAWINGS

FIG. 10 is a front view one of the connector plates of the assembly shown in FIG. 9.

FIG. 11 is a side elevational view of the connector plate shown in FIG. 10.

FIG. 12 is a front view of the other of the connector plates of the assembly shown in FIG. 9.

FIG. 13 is a side elevational view of the connector plate shown in FIG. 12.

DESCRIPTION OF THE INVENTION

Figure 1:
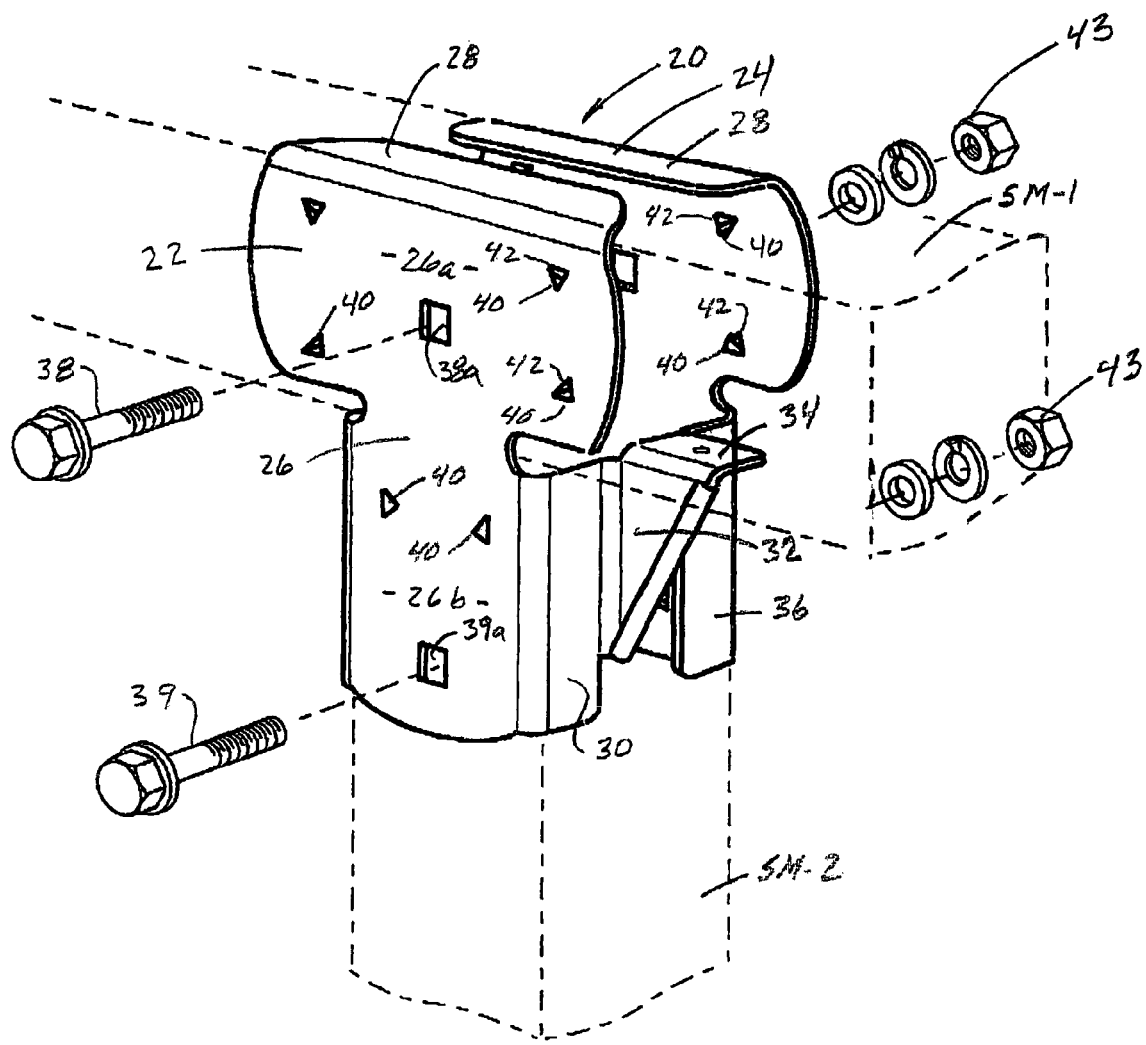
FIG. 1 is a generally perspective view of one form of the connector assembly of the present invention.
Figure 2:
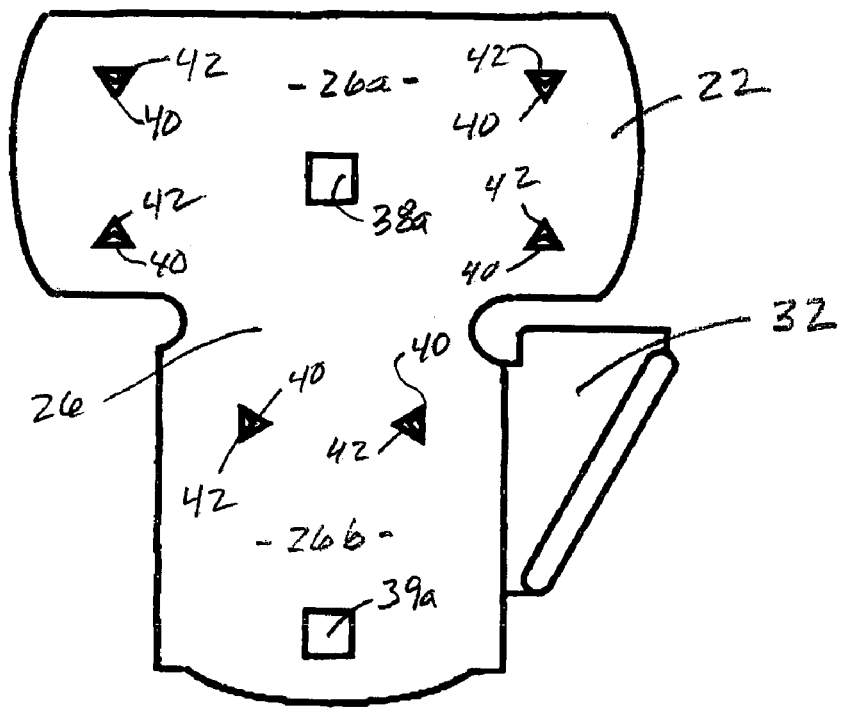
FIG. 2 is a front view of one of the two identical connector plates of the assembly shown in FIG. 1.
Figure 3:
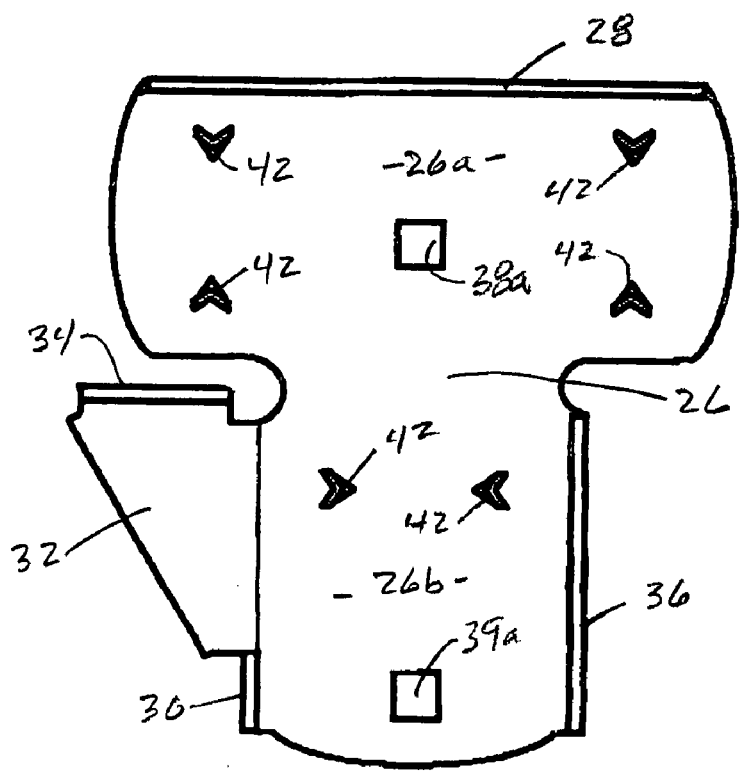
FIG. 3 is a rear view of the other of the connector plates shown in FIG. 2.

Referring to the drawings and particularly in FIGS. 1 through 7, one form of the bracket assembly of the invention for interconnecting first and second elongate structural members is there illustrated and generally designated by the numeral 20. The bracket assembly here comprises first and second cooperating brackets 22 and 24 and connector means for interconnecting the cooperating brackets. Brackets 22 and 24 are of identical construction and each comprises a generally planar surface 26 having a first generally rectangularly shaped portion 26a and second generally rectangularly shaped portion 26b. As indicated in figure 1, first portion 26a engages the first elongate structural member SM-1 and the second portion 26b engages the second elongate structural member SM-2. In this instance, structural members SM-1 and SM-2 are wooden beams which extend generally perpendicularly relative to one another.

Extending generally perpendicularly from first portion 26a of planar surface 26 is a generally rectangularly shaped first wall 28 that is adapted to engage the top surface of first structural member SM-1. A second generally rectangularly shaped wall 30 is connected to and extends generally perpendicularly from one side of the second portion 26b of generally planar surface 26 for engaging one side of the second structural member. Connected to and extending generally perpendicularly from second wall 30 is a third, generally triangularly shaped wall 32 and connected to and extending generally perpendicularly from third wall 32 is a fourth wall 34 that is adapted to engage the lower surface of first structural member SM-1. Importantly, this fourth wall which is apertured to a receive wood screw (not shown) provides substantial longitudinal stability to structural member SM-1 against off center loading.

Also connected to and extending generally perpendicular from the other side of second portion 26b of generally planar surface 26 for engaging the opposite side of second structural member SM-2 is a generally rectangularly shaped fifth wall 36. Fifth wall 36 is generally parallel to second wall 30 so that when the brackets are in use structural member SM-2 is securely captured between walls 30 and 36 when the brackets 28 are interconnected with structural member SM-2 in the manner shown in FIG. 1.

As best seen in FIG. 1, the connector means of this first form of the invention comprises a first through bolt 38 for interconnecting the first portions 26a of the cooperating brackets with the first elongating structural member SM-1 and a second bolt 39 for interconnecting the second portions 26b of the cooperating brackets with the second elongate structural member SM-2. Portions 26a are provided with apertures 38a for receiving bolt 38 and portion 26b are provided with apertures 39a for receiving bolt 39.

Figure 4:
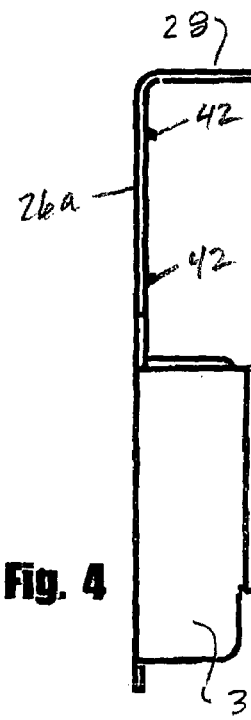
FIG. 4 is a side elevational view of the connector plate shown in FIG. 2.
Figure 5:
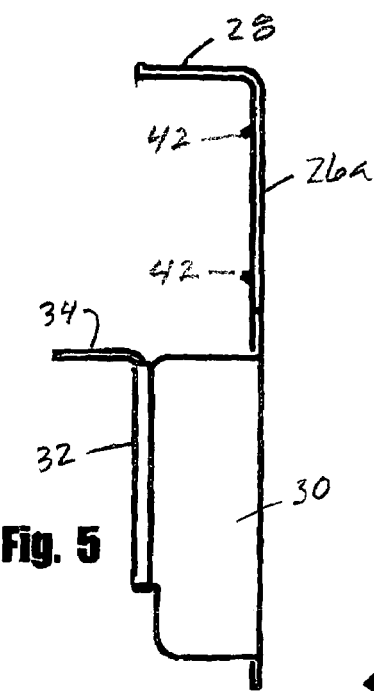
FIG. 5 is a side elevational view of the opposing side of the connector plate shown in FIG. 2.
Figure 6:
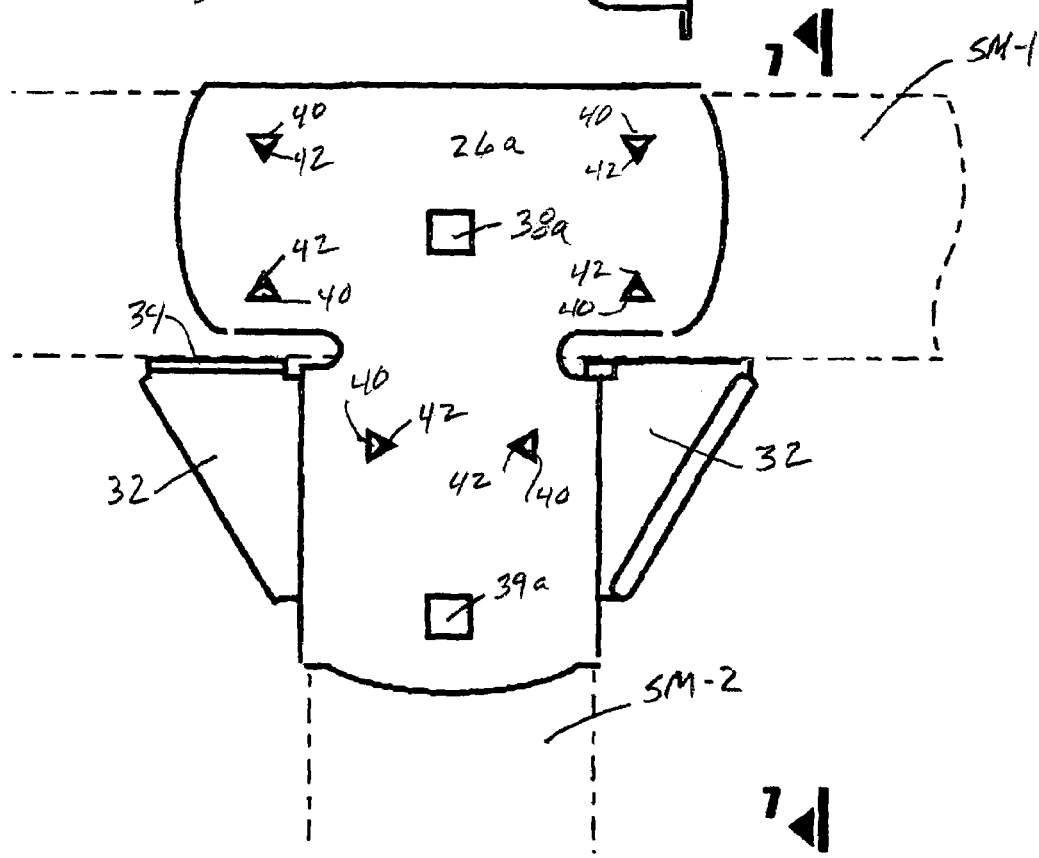
FIG. 6 is a front view of the connector assembly shown in FIG. 1.
Figure 7:
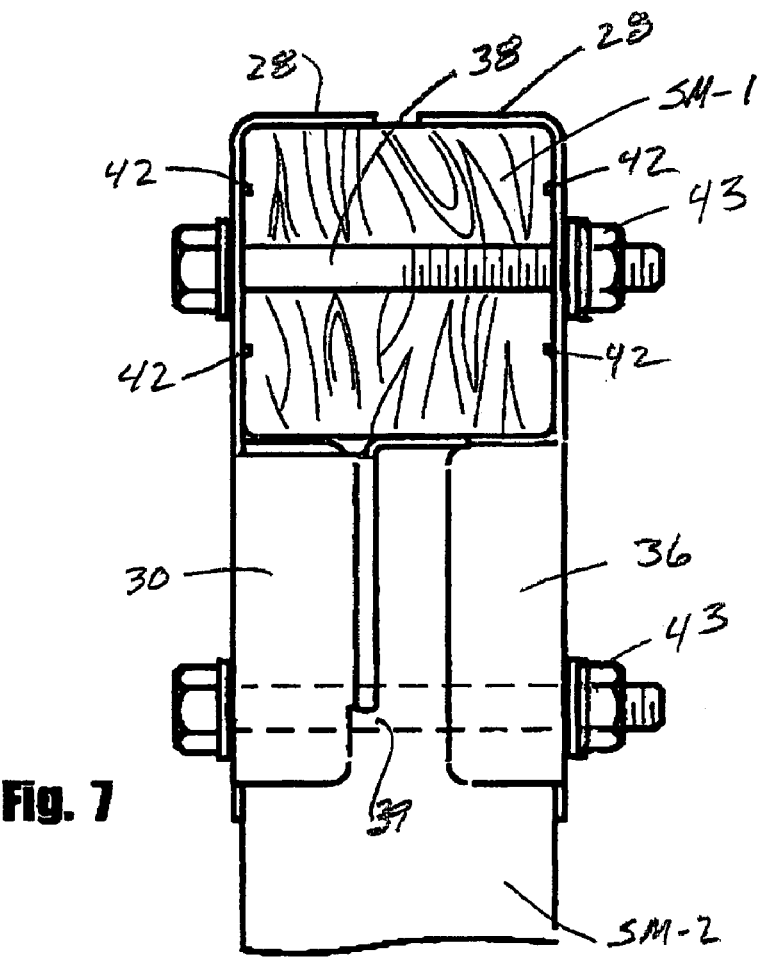
FIG. 7 is a view taken along lines 7-7 of FIG. 6.
Figure 8:
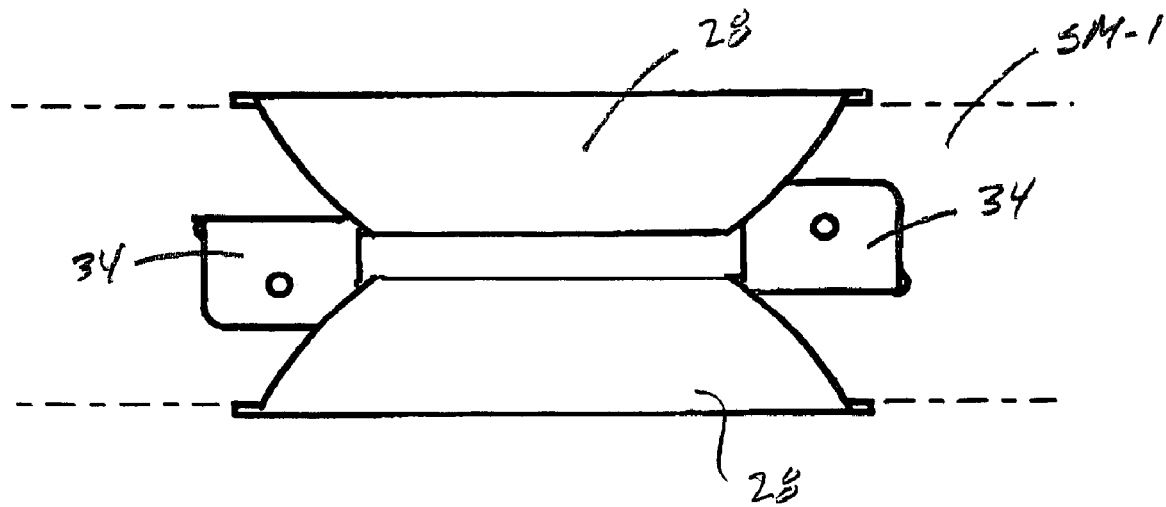
FIG. 8 is a top plan view of the connector assembly shown in FIG. 7.

Another important feature of the bracket assembly of the present invention resides in the fact that each of the first and second portions 26a and 26b of the generally planar surface 26 of each of said first and second brackets is provided with a plurality of spaced apart, lanced out areas 40 which form protruding tabs 42 for penetrating the first and second elongate structural members (FIGS. 4, 5 and 7). The protruding tabs 42 are strategically formed to resist possible pivotal motion of the structural members about the thorough bolts.

In use, the identically configured brackets 22 and 24 are aligned in a confronting relationship in the manner shown in FIG. 1 and, along with the structural members, are securely bolted together by the strategically located through bolts 38 and 39. It is to be noted that bolt 39 is positioned proximate the lower end of the brackets to effectively resist rotational movement of the brackets. As the bolts 38 and 39 are cinched down against the structural members SM-1 and SM-2 using mating cap nuts 43, and conventional lock washers and flat washers the lanced out tabs 42 will penetrate the structural members so that the brackets securely grip the structural members further increasing the rigidity of the structure. With the construction shown in FIG. 1, bracket portions 28 securely engage the top surface of structural member SM-1 and bracket portions 30 and 36 securely engage the side surfaces of structural member SM-2. Additionally, portions 34 of the brackets engage the bottom surface of structural member SM-2 to provide additional longitudinal stability. It is apparent that due to the novel design of the connector brackets, when the brackets are interconnected with the structural members in the manner shown in FIG. 1, the interconnected brackets uniquely provide both longitudinal and transverse stability to the structure formed by the interconnected structural members.

Turning next to FIGS. 9 through 15, another form of bracket assembly of the invention is there illustrated and generally identified by the numeral 44. This assembly is similar in many respects to that shown in FIGS. 1 through 8 and like numbers are used in FIGS. 9 through 15 to identify like components. Like the earlier described embodiment of the invention, this latest connector assembly is adapted to securely join together a pair of elongated, wooden structural members SM-3 and SM-4. However, in this instance the connector assembly is specially designed to interconnect together structural members such as 4"×4" and 4"×6" members, that extend angularly with respect to one another at an angle other than ninety degrees as, for example, approximately 80 degrees. It is to be recognized that the bracket of the invention can be used to interconnect structural members of various dimensions such as 6"×6" members and the like.

Once again the connector assembly is made up of a pair of specially configured, gripping plates 48 and 50 that are aligned in a confronting relationship and are securely bolted together by strategically located through bolts 38, 39 and 40 that are receivable within apertures 38a, 39a and 40a respectively formed in planar surface 52. The gripping plates 48 and 50 are substantially mirror images, save for the position and the side gassets (see FIGS. 10 and 12) and each includes a generally planar surface 52 having a first generally rectangularly shaped portion 52a and second generally rectangularly shaped portion 52b. As shown in FIG. 10 first portion 52a of generally planar surface 52 has a major axis 54 and a minor axis 56. Similarly, second portion 52b has a major axis 58 and a minor axis 60. In the brackets of the present invention the major axis 58 of second portion 52b extends at an angle "x" with respect to the major axis 54 first portion 52a which angle, in this instance, is approximately 80 degrees.

Figure 9:
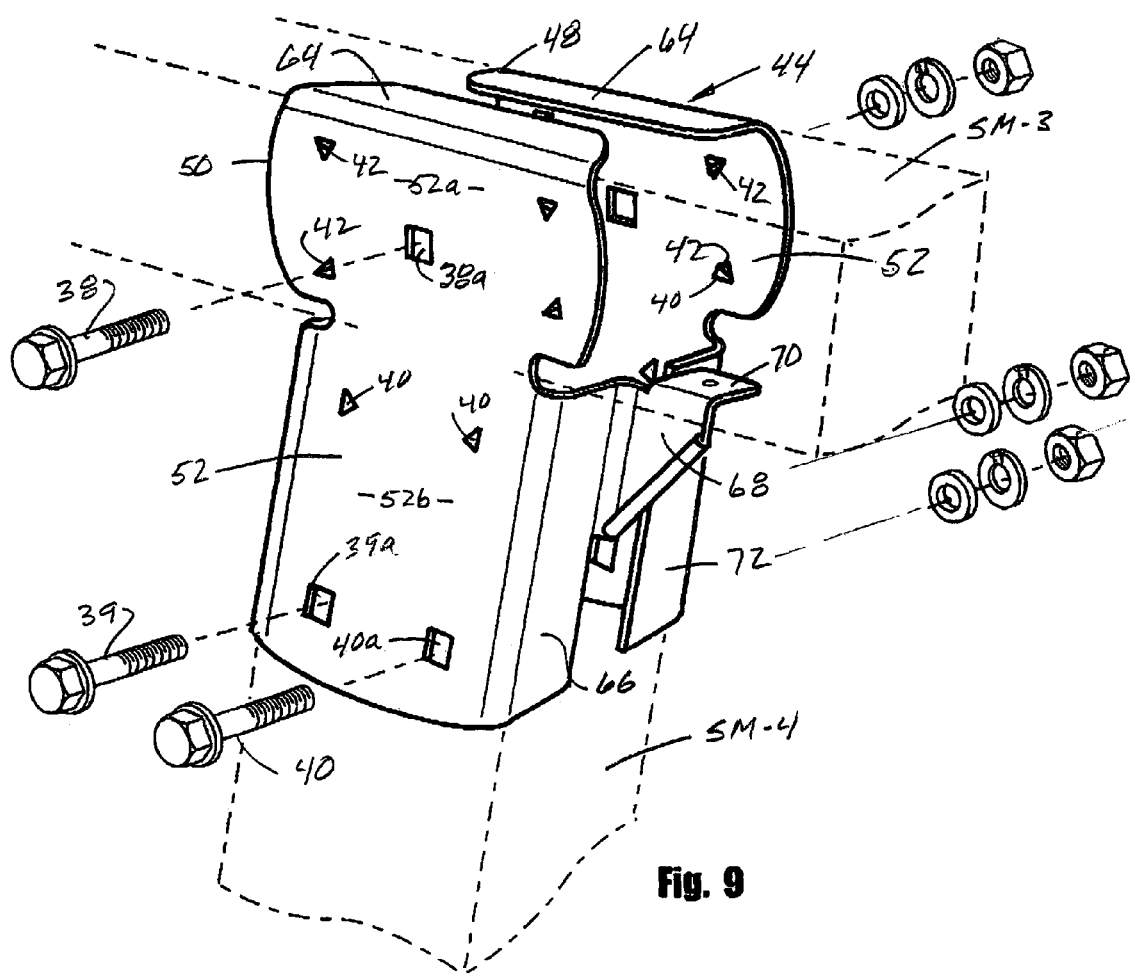
FIG. 9 is a generally perspective view of an alternate form of the connector assembly of the present invention.

As indicated in FIG. 9, first portion 52a engages elongate structural member SM-3 and the second portion 52b engages elongate structural member SM-4. Extending generally perpendicularly from first portion 52a of planar surface 52 is a generally rectangularly shaped first wall 64 that is adapted to engage the top surface of structural member SM-3. A second generally rectangularly shaped wall 66 is connected to and extends generally perpendicularly from the second portion 52b of generally planar surface 52 for engaging structural member SM-4. Connected to and extending generally perpendicularly from second wall 66 is a third, generally triangularly shaped wall 68 and connected to and extending generally perpendicularly from third wall 68 is a fourth wall 70 that is adapted to engage structural member SM-3. Importantly, this fourth wall once again provides substantial longitudinal stability to structural member SM-3.

Also connected to and extending generally perpendicular from second portion 52b of generally planar surface 52 for engaging structural member SM-4 is a generally rectangularly shaped fifth wall 72. Fifth wall 72 is generally parallel to wall 66 so that structural member SM-4 is captured between walls 66 and 72 when the brackets are interconnected with the structural members in the manner shown in FIG. 9.

As best seen in FIG. 9, the connector means of this first form of the invention comprises a first bolt 38 for interconnecting the first portions 52a with structural member SM-3 and second and third bolts 39 and 40 for interconnecting portion 52b with elongate structural member SM-4.

Figure 14:
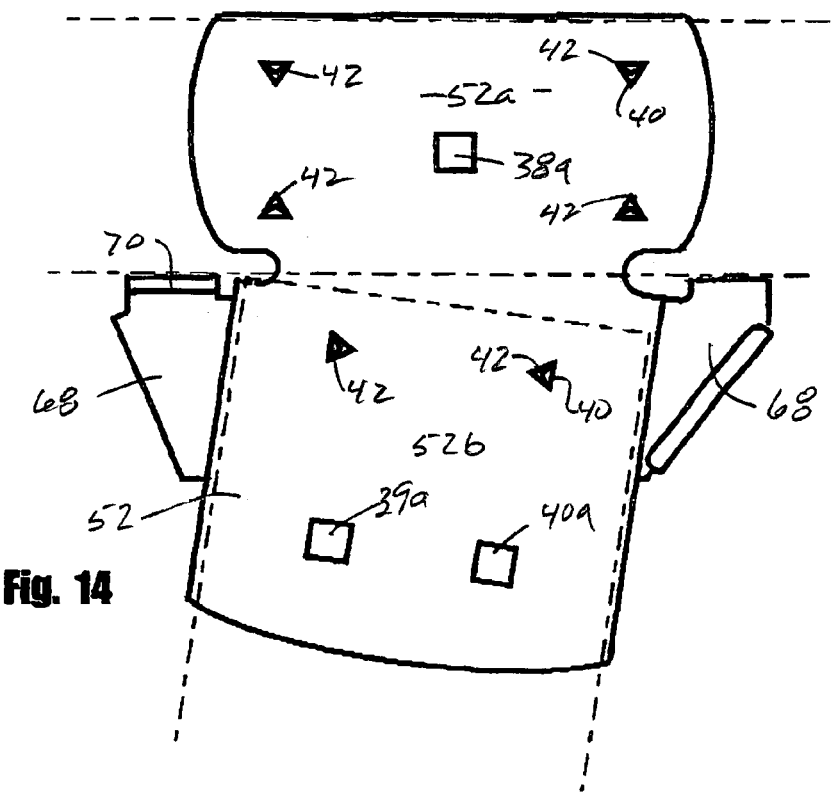
FIG. 14 is a front view of the connector assembly shown in FIG. 9.
Figure 15:
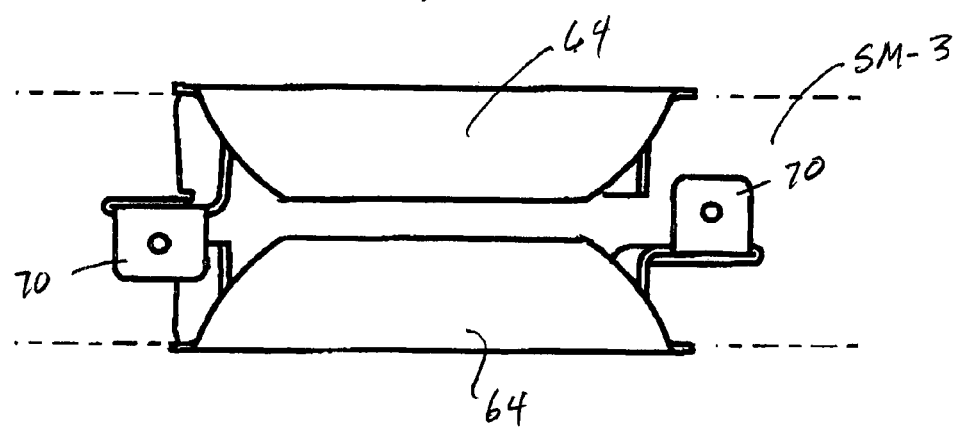
FIG. 15 is a top plan view of the connector assembly shown in FIG. 15.

Another important feature of the bracket assembly of this latest form of the invention resides in the fact that each of said first and second portions 52a and 52b of the generally planar surface 52 of each of said first and second brackets is provided with a plurality of spaced apart, lanced out areas 40 which form protruding tabs 42 for penetrating the first and second elongate structural members (FIGS. 9, 13 and 14).

In use brackets 48 and 50 are aligned in a confronting relationship in the manner shown in FIG. 9 and are securely bolted together by strategically located through bolts 38, 39 and 40. As the bolts are cinched down against the structural members SM-3 and SM-4, the lanced out tabs 42 will penetrate the structural members so that the brackets securely grip the structural members.

With the construction shown in FIG. 9, bracket portions 64 securely engage the top surface of structural member SM-3 and bracket portions 66 and 72 securely engage the side surfaces of structural member SM-4. Additionally, apertured portions 70 of the brackets engage the bottom surface of structural member SM-3 and, if desired can be interconnected therewith using woodscrews to provide additional longitudinal stability. It is apparent that due to the novel design of the connector brackets, when the brackets are interconnected with the structural members in the manner shown in FIG. 9, the interconnected brackets once again uniquely provide both longitudinal and transverse stability to the structure formed by the interconnected structural members.

Figure 16:
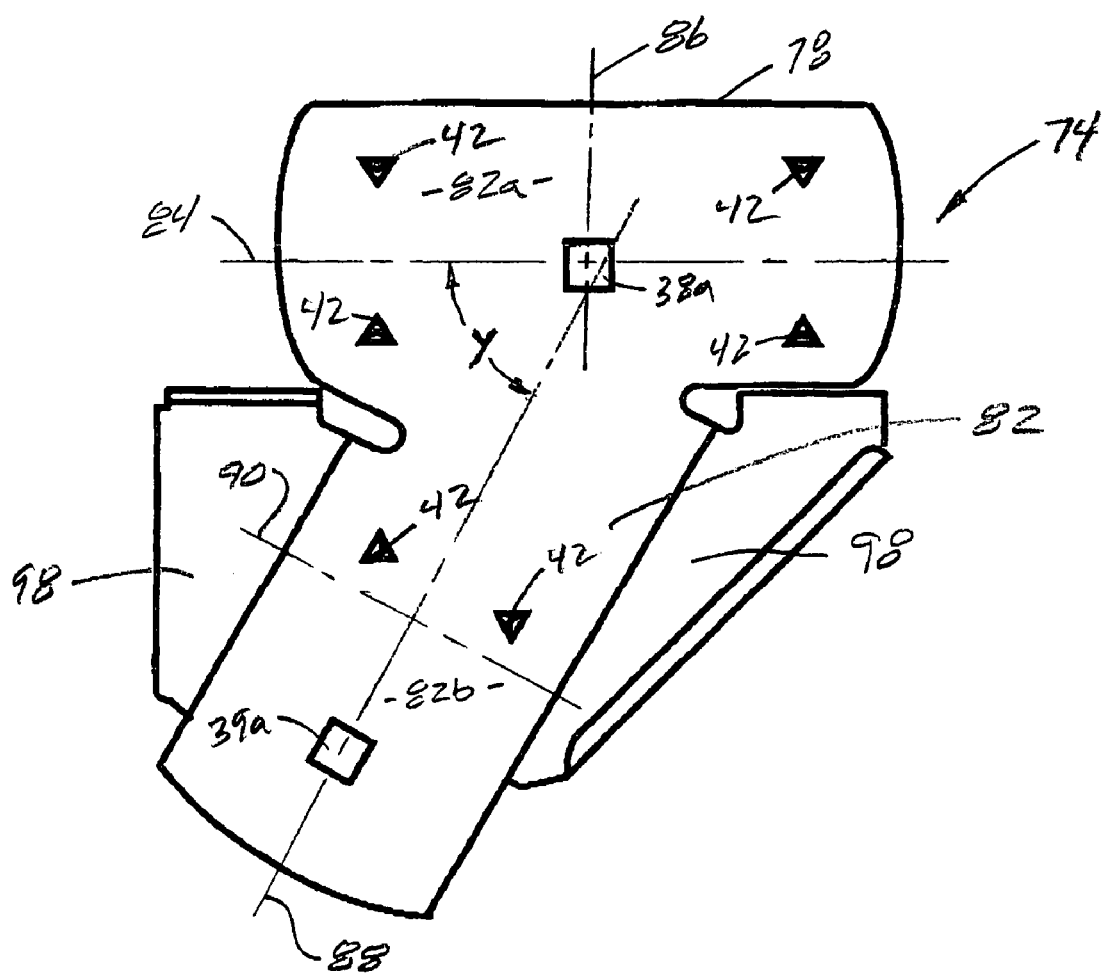
FIG. 16 is a front view of yet another form of connector assembly of the invention.
Figures 17, 18:
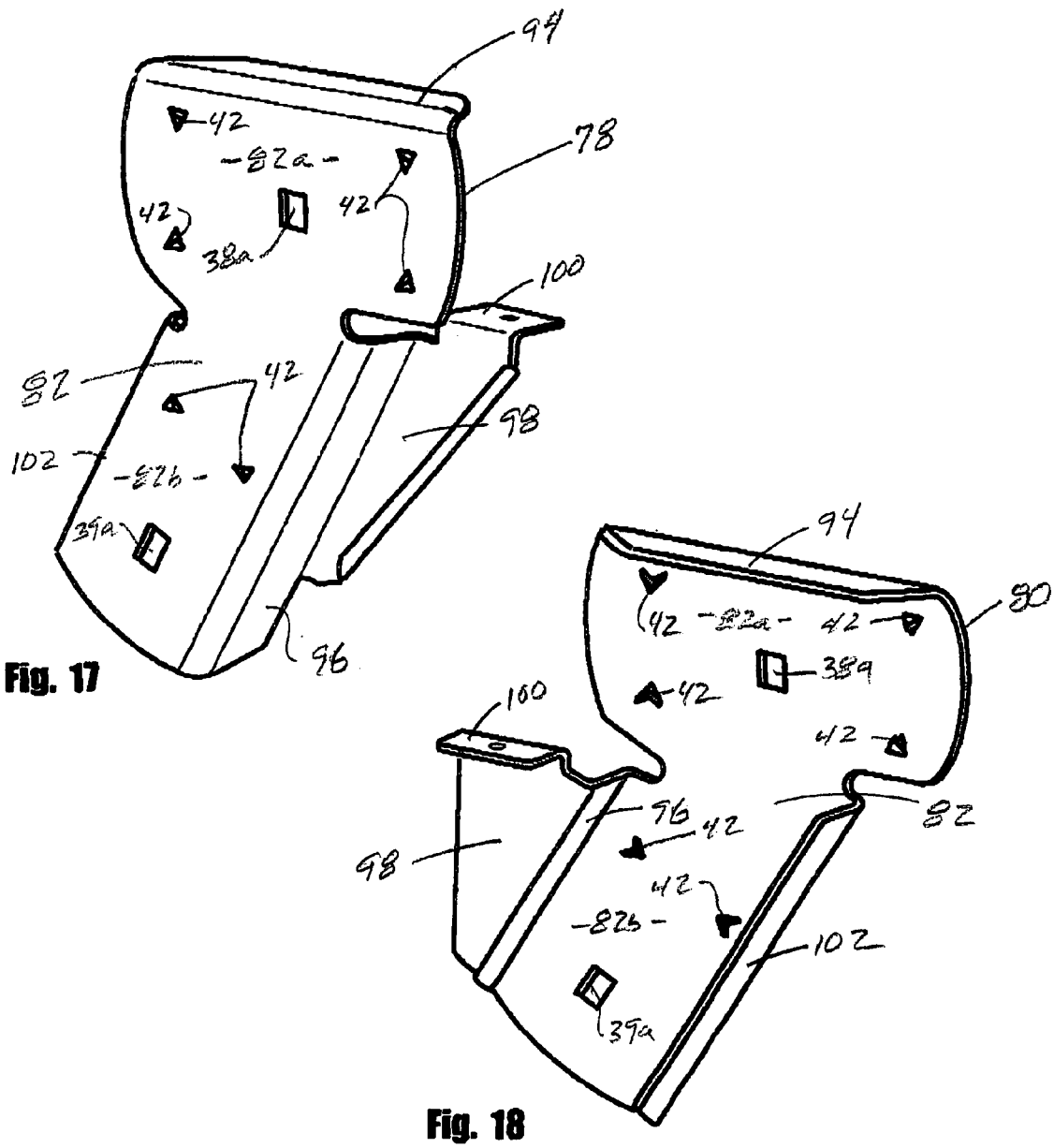
FIG. 17 is a generally perspective view of one of the plates of the assembly shown in FIG. 16.
FIG. 18 is a generally perspective view of the other of the plates of the assembly shown in FIG. 16.

Referring next to FIGS. 16 through 18, still another form of bracket assembly of the invention is there illustrated and generally identified by the numeral 74. This assembly is also similar in many respects to that shown in FIGS. 1 through 8 and like numbers are used in FIGS. 16 through 18 to identify like components. Like the earlier described embodiments of the invention, this latest connector assembly is adapted to securely join together a pair of elongated, wooden structural members. However, in this instance the connector assembly is specially designed to interconnect together structural members that extend angularly with respect to one another at an angle other than ninety degrees as, for example, approximately 30 degrees.

Once again the connector assembly is made up of a pair of specially configured gripping plates 78 and 80 (FIGS. 17 and 18) that are aligned in a confronting relationship and are securely bolted together by strategically located through bolts of the same character as previously identified bolts 38 and 39. The gripping plates 78 and 80 are substantially mirror images save for the location at the side gassets and each includes a generally planar surface 82 having a first generally rectangularly shaped portion 82a and second generally rectangularly portion 82b. As shown in FIG. 16, first portion 82a of generally planar surface 82 has a major axis 84 and a minor axis 86. Similarly, second portion 82b has a major axis 88 and a minor axis 90. In the brackets of this latest form of the invention the major axis 88 of second portion 82b extends at an angle "y" with respect to the major axis 84 first portion 82a which, in this instance, is approximately 30 degrees.

In using the brackets of this latest form of the invention, the first portion 82a engages a first elongate structural member such as a member similar to member SM-3 and the second portion 52b engages the second elongate structural member such as a member similar to member SM-4.

Extending generally perpendicularly from first portion 82a of planar surface 82 is a generally rectangularly shaped first wall 94 that is adapted to engage the top surface of the first structural member. A second generally rectangularly shaped wall 96 is connected to and extends generally perpendicularly from the second portion 82b of generally planar surface 82 for engaging the second structural member. Connected to and extending generally perpendicularly from second wall 96 is a third, generally triangularly shaped wall 98 and connected to and extending generally perpendicularly from third wall 98 is an apertured fourth wall 100 that is adapted to engage the first structural member. Importantly, this fourth wall once again provides substantial longitudinal stability to the first structural member.

Also connected to and extending generally perpendicular from second portion 82b of generally planar surface 82 for engaging the second structural member is a generally rectangularly shaped fifth wall 102. Fifth wall 102 is generally parallel to second wall 96 so that the second structural member is captured between walls 96 and 102 when the brackets are interconnected with the second structural member.

As in the earlier described embodiments of the invention, the connector means of this latest form of the invention comprises a first bolt for interconnecting the first portion 82a of generally planar surface 82 with the first elongating structural member and a second bolt for interconnecting the second portion 82b of generally planar surface 82 with the second elongate structural member. These connecting bolts are not shown in FIGS. 16 through 18, but are similar in configuration and operation to the earlier described bolts 38 and 39.

Another important feature of the bracket assembly of this latest form of the invention resides in the fact that each of said first and second portions 82a and 82b of the generally planar surface 82 of each of said first and second brackets is provided with a plurality of spaced apart, lanced out areas which include protruding tabs of character previously described for penetrating the first and second elongate structural members.

In use, the brackets 78 and 80 are aligned in a confronting relationship in the manner shown in FIGS. 17 and 18 and are securely bolted together by strategically located through bolts, such as the bolts 38 and 39. When the bolts are cinched down against the structural members using nuts 43 (not shown), the lanced out tabs 42 will penetrate the structural members so that the brackets securely grip the structural members. With the construction shown, bracket portions 94 securely engage the top surface of the first structural member and bracket portions 96 and 102 securely engage the side surfaces of the second structural member. Additionally portions 100 of the brackets engage the bottom surface of the second structural member to provide additional longitudinal stability. The brackets of the invention can be constructed from a variety of materials, including steel, aluminum and various composite materials.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A bracket assembly for interconnecting first and second elongate structural members, said bracket assembly comprising first and second interconnected cooperating brackets and first and second bolts interconnecting together said first and second cooperating brackets, said first and second brackets comprising,
   (a) a generally planar surface having a first portion and second portion, said first portion engaging the first elongate structural member and said second portion engaging the second elongate structural member;
   (b) a first wall connected to and extending generally perpendicularly from said first portion of said generally planar surface for engaging the first structural member;
   (c) a second wall connected to and extending generally perpendicularly from said second portion of said generally planar surface for engaging the second structural member;
   (d) a third wall connected to and extending generally perpendicularly from said second wall; and
   (e) a fourth wall connected to and extending generally perpendicularly from said third wall for engaging the first structural member.

2. The bracket assembly as defined in claim 1 in which said first bolt interconnects said first portion of said generally planar surface of said first bracket with said first portion of said generally planar surface of said second bracket.

3. The bracket assembly as defined in claim 1 in which each of said first and second portions of said generally planar surface of each of said first and second brackets is provided with a plurality of spaced-apart, lanced out areas which form protruding tabs for penetrating the first and second elongate structural members.

4. The bracket assembly as defined in claim 1 further including a fifth wall connected to and extending generally perpendicularly from said second portion of said generally planar surface for engaging the second structural member.

5. The bracket assembly as defined in claim 1 in which said third wall of each of said first and second assembly brackets is generally triangular in shape.

6. The bracket assembly as defined in claim 1 in which each of said first and second portion of said generally planar surfaces of said first and second brackets is generally rectangular in shape.

7. The bracket assembly as defined in claim 6 in which each of said first and second portions of said generally planar surfaces has a major axis and a minor axis, said major axis of said second portion extending at an angle with respect to said major axis of said first portion.

8. The bracket assembly as defined in claim 7 in which said major axis of said second portion extends at an angle of about ninety degrees with respect to said major axis of said first portion.

9. The bracket assembly as defined in claim 7 in which said major axis of said second portion extends at an angle of less than ninety degrees with respect to said major axis of said first portion.

10. A bracket assembly for interconnecting first and second elongate structural members, said bracket assembly comprising substantially identical first and second interconnected cooperating brackets and first and second bolts interconnecting together said first and second brackets, said first and second brackets each comprising:
    (a) a generally planar surface having a first portion and second portion, said first portion engaging the first elongate structural member and said second portion engaging the second elongate structural member;
    (b) a first wall connected to and extending generally perpendicularly from said first portion of said generally planar surface for engaging the first structural member;
    (c) a second wall connected to and extending generally perpendicularly from said second portion of said generally planar surface for engaging the second structural member;
    (d) a third wall connected to and extending generally perpendicularly from said second wall;
    (e) a fourth wall connected to and extending generally perpendicularly from said third wall for engaging the first structural member; and
    (f) a fifth wall connected to and extending generally perpendicular from said second portion of said generally planar surface for engaging the second structural member.

11. The bracket assembly as defined in claim 10 in which said connector means comprises a first bolt for interconnecting said first portion of said generally planar surface with the first elongating structural member and a second bolt for interconnecting said second portion of said generally planar surface with the second elongate structural member.

12. The bracket assembly as defined in claim 10 in which each of said first and second portions of said generally planar surface of each of said first and second brackets is provided with a plurality of spaced-apart, lanced out areas which form protruding tabs for penetrating the first and second elongate structural members.

13. The bracket assembly as defined in claim 10 in which said third wall of each of said first and second assembly brackets is generally triangular in shape.

14. The bracket assembly as defined in claim 10 in which each of said first and second portions of said generally planar surfaces has a major axis and a minor axis, said major axis of said second portion extending at an angle with respect to said major axis of said first portion.

15. The bracket assembly as defined in claim 14 in which said major axis of said second portion extends at an angle of about ninety degrees with respect to said major axis of said first portion.

16. The bracket assembly as defined in claim 14 in which said major axis of said second portion extends of an angle of less than ninety degrees with respect to said major axis of said first portion.

17. A bracket assembly for interconnecting first and second elongate structural members comprising:
    (a) A first bracket disposed in engagement with the first and second elongate structural members said first bracket comprising:
        (i) a generally planar surface having a first generally rectangular portion and second generally rectangular portion, said first generally rectangular portion having an aperture and engaging the first elongate structural member and said second generally rectangular portion having an aperture and engaging the second elongate structural member;
        (ii) a first wall connected to and extending generally perpendicularly from said first portion of said generally planar surface for engaging the first structural member;

(iii) a second wall connected to and extending generally perpendicularly from said second portion of said generally planar surface for engaging the second structural member;

(iv) a generally triangular shaped third wall connected to and extending generally perpendicularly from said second wall;

(v) a fourth wall connected to and extending generally perpendicularly from said third wall for engaging the first structural member; and (vi) a fifth wall connected to and extending generally perpendicularly from said second portion of said generally planar surface for engaging the second structural member; and (b) a second bracket disposed in engagement with the first and second structural members, said second bracket comprising:

(i) a generally planar surface having a first generally rectangular portion and second generally rectangular portion, said first generally rectangular portion having an aperture and engaging the first elongate structural member and said second generally rectangular portion having an aperture and engaging the second elongate structural member, said first and second generally rectangular portions being substantially parallel to said first and second rectangular portions of said first bracket;

(ii) a first wall connected to and extending generally perpendicularly from said first portion of said generally planar surface for engaging the first structural member;

(iii) a second wall connected to and extending generally perpendicularly from said second portion of said generally planar surface for engaging the second structural member;

(iv) a generally triangular shaped third wall connected to and extending generally perpendicularly from said second wall; (v) a fourth wall connected to and extending generally perpendicularly from said third wall for engaging the first structural member; and (vi) a fifth wall connected to and extending generally perpendicularly from said second portion of said generally planar surface for engaging the second structural member; and (c) a first connector member extending through said aperture of said first generally rectangular portion of said first bracket and extending through said aperture of said first generally rectangular portion of said second bracket for interconnecting together said first and second cooperating brackets.

18. The bracket assembly as defined in claim 17 in which each of said first and second portions of said generally planar surface of each of said first and second brackets is provided with a plurality of spaced-apart, lanced out areas which form protruding tabs for penetrating the first and second elongate structural members.

* * * * *